United States Patent Office 2,722,232
Patented Nov. 1, 1955

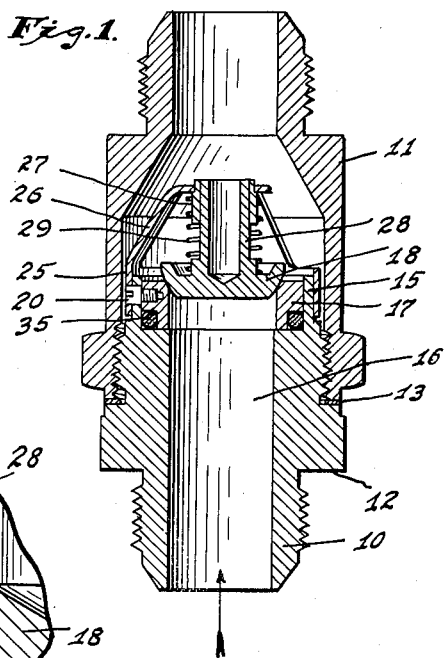

2,722,232

CHECK VALVE

Austin O. Roche, Jr., Indianapolis, Ind., assignor to Hoffman Specialty Mfg. Corp., Indianapolis, Ind., a corporation of Indiana Application August 17, 1951, Serial No. 242,283

6 Claims. (Cl. 137—515.5)

This invention relates to check valves, and more particularly to check valves which must retain fluid under pressure without substantial leakage. In assemblies of parts which convey liquid, especially liquid under high pressure, it is necessary that all joints be tight; and frequently, the strains imposed upon the parts in effecting the necessary tight joints introduce into those parts stresses which result in strain or deformation. Loading after assembly may also result in strain or deformation. Where a check-valve seat is formed in or rigid with a part subjected to heavy assembly or loading stresses, the strain or deformation may result in distortion of the seat and a consequent incomplete closing of the check valve, and undesirable leakage may follow.

It is therefore an object of my invention to produce an assembly of parts including a check valve so constructed and arranged that the check valve will retain high pressures in spite of any distortion suffered by the parts with which it is associated.

In carrying out the invention, I form the valve-seat, the valve, and the valve-closing spring as a sub-assembly which, as a unit, possesses a certain freedom of movement. Preferably, I provide the part which is to have the check valve associated with it, and which has a central opening for passage of the high-pressure liquid, with an annular flange surrounding such opening and adapted to receive loosely an annular valve seat. Such flange is provided at intervals around its periphery with a plurality of openings which loosely receive the bodies or heads of screws extending radially through such openings into screw-threaded recesses in the valve seat. The screws mentioned project outwardly beyond the annular flange for engagement with a cage which takes the reaction of the customary spring employed to urge the valve member itself into engagement with the seat. Any appropriate form of sealing means may be employed between the valve seat and the flange member to prevent the escape of liquid around the exterior of the valve seat. In such an arrangement, the valve seat, the screws, the cage, the spring, and the valve member form an assembly which, although permanently connected with the flanged member, possesses a limited freedom of movement as a unit in all directions relative to such flanged member, with the result that any distortion of the flanged member resulting from assembly stresses is not transmitted to the valve seat.

The accompanying drawing illustrates the invention: Fig. 1 is an axial section through an assembly of fittings embodying a check valve; Fig. 2 is a fragmental view similar to Fig. 1 but on an enlarged scale; and Fig. 3 is a fragmental view similar to Fig. 2 illustrating a modified form of the invention.

The assembly of parts illustrated in Fig. 1 comprises a nipple 10 screw-threadedly mounted in one end of a coupling 11. The nipple has an annular flange 12, which is conveniently polygonal for reception of a wrench; and between such flange and the adjacent end of the coupling 11 is a metal gasket 13 adapted to prevent leakage of high-pressure fluid from the joint between the nipple and coupling. To compress the metal gasket 13 sufficiently to prevent leakage, considerable effort must be applied; and such effort is frequently found to cause some slight distortion in the body of the nipple.

In incorporating a check valve embodying my invention in association with the nipple 10, such nipple is provided on its inner end with an annular flange 15 concentric with, and having an internal diameter somewhat greater than, the axial passage 16 through the nipple. Within the flange 15 there is loosely received a valve seat 17 with which a valve member 18 co-operates. The valve seat 17 is retained within the flange 15 by means of an annular series of screws 20 which pass radially through holes 21 in the flange into screw-threaded recesses 22 in the valve seat 17. Desirably, the screws 20 are shouldered so that when tightened their shoulders will fit firmly against the peripheral surface of the valve seat.

The bodies or heads of the screws 20 are of such a length that, when the screws are seated, they will project radially outward for a distance beyond the flange 15 for reception in holes 24 in the annular base 25 of a spring-cage 26. Such spring-cage extends inwardly beyond the end of the flange 15 and is there provided with a bushing 27 (Fig. 1) which slidably receives the stem 28 of the valve member 18. A compression spring 29 surrounds the valve stem 28 and the bushing 27 and acts between the cage 26 and the head of the valve member 18 to urge the latter into sealing engagement with the valve-seat 17. Conveniently, the sealing surface of the valve member 18 is spherical in contour while the valve-seat surface it engages is frusto-conical and tangent to such spherical surface.

Because of the loose fit of the valve-seat 17 within the flange 15 it is necessary to provide a seal for preventing passage of fluid around the exterior of the valve-seat, and for that purpose, any convenient form of seal may be employed. In Figs. 1 and 2 I have illustrated an O-ring seal 35 received in an annular groove 36 in the valve-seat and seating against the walls of that groove, the inner wall 37 of the flange 15, and the bottom 38 of the counterbore defined by such flange. In Fig. 3, I have shown a metal-to-metal seal formed by engagement between the surface 38 and the rounded lower face 39 of a narrow, annular flange 40 on the bottom of the valve seat 17'. Under fluid pressure from above, the valve seat 17' is forced downwardly, and the resultant high unit-pressure thus created over the small-area, inter-engaging surfaces 38 and 39 creates an effective seal.

The holes 21 in the flange 15 and the holes 24 in the cage-base 25 are sufficiently larger than the screws 20 to insure that any lack of alignment between those holes and the screw-receiving recesses 22 caused by manufacturing inaccuracies, distortion of the flange 15, or engagement of the valve seat with the surface 38 will not interfere with the loose reception of the screws 20 within the holes 21 and 24. In addition, as indicated above, the inner diameter of the flange 15 is appreciably greater than the outer diameter of the valve-seat 17, so that such valve-seat is loosely received within the flange.

The spring 29 urges the spring-cage 26 upwardly relative to the valve seat to the limit permitted by engagement of the screws 20 with the bottoms of the holes 24; but since the downward spring reaction is taken by the valve seat, the spring has no effect on the position of such screws within the holes 21 in the flange 15. Accordingly, the sub-assembly comprising the valve-seat 17, valve member 18, and spring cage 26 is free to move as a unit relative to the nipple 10, although it is permanently connected to such nipple by reason of the presence of the screws 20 in the flange-holes 21. The extent of such movability should be great enough to insure that any distortion which the nipple 10 sustains in use will not result in the transference of distorting stresses to the valve-seat 17. In practice, I provide about 0.003 to 0.004 inch clearance (radial) between the outer valve-seat surface and the flange 15 for each inch of valve-seat diameter. Clearance between the screws 20 and the holes 21 and 24 will depend on the accuracy with which those holes and the threaded recesses 22 are located; but the flange-holes 21 should be sufficiently larger than the screws 20 to permit at least about 0.5 degree of angular movement of the valley assembly about any axis. The internal diameter of the coupling 11 should be great enough that the desired freedom of movement of the valve sub-assembly will not be interfered with by engagement of the screws 20 with the inner surface of the coupling.

The valve cage 26 will ordinarily be made of relatively thin stock, and any transfer of force to it as a result of distortion of the flange 15 is therefore not likely to distort the valve seat 17. Nevertheless it may be desirable to provide a few thousandths of an inch clearance between the cage-base 25 and the flange 15, as indicated at 42 in Figs. 2 and 3.

It will be understood that the particular arrangement shown and described is presented by way of example and that the invention is not limited to any specific details.

I claim as my invention:

1. In combination with a member having a liquid passage therein, a check valve assembly for preventing flow in one direction through said passage, said check valve assembly having an annular valve-seat, a valve member movable axially into and out of engagement with said seat, and yielding means urging the valve member toward the seat, connecting means connecting the check valve assembly to said first named member while permitting a limited and substantially unopposed movement of the check valve assembly as a unit relative to said first named member, and a seal between the valve-seat and the first named member for preventing flow of fluid around the outside of the valve seat.

2. The invention as set forth in claim 1 with the addition that the first named member is provided with an annular flange surrounding said passage and loosely embracing the valve-seat, said flange having an annular series of radial openings, and valve-retaining elements connected to the valve-seat and loosely received in said openings.

3. The invention set forth in claim 2 with the addition that said retaining elements project outwardly beyond said flange, said check-valve assembly including a cage surrounding said flange and retained in association therewith by engagement with said retaining elements, said yielding means acting between the cage and valve member.

4. The invention set forth in claim 1 with the addition that said first named member is counterbored to receive the valve-seat loosely, the inner end of the valve-seat being provided with an annular groove, said seal being a resilient O-ring seal received in said groove for engagement with the side and bottom walls of the counterbore.

5. The invention set forth in claim 1 with the addition that said first named member is counterbored to receive the valve-seat loosely, the inner end of the valve-seat being provided with a narrow annular rib engageable with the bottom of the counterbore and constituting said seal.

6. In combination with a member having a liquid passage therein, a check valve for preventing flow in one direction through said passage, said check valve having an annular valve-seat, a valve member movable axially into and out of engagement with said seat, connecting means connecting said seat to said first named member while permitting a limited relative movement of the seat and member, a seal between the valve-seat and the first named member for preventing flow of fluid around the outside of the valve-seat, a spring cage, connecting means connecting the valve cage to the valve-seat while permitting a limited movement of the cage relative to the seat and member, and a compression spring acting between said cage and valve member to urge the valve member toward the seat.

References Cited in the file of this patent

UNITED STATES PATENTS

| | | |
|---|---|---|
| 690,046 | Bickel | Dec. 31, 1901 |
| 1,975,635 | Dunham | Oct. 2, 1934 |
| 1,984,328 | Bechtold | Dec. 11, 1934 |
| 2,228,241 | Baker | Jan. 14, 1941 |
| 2,263,750 | Willke | Nov. 25, 1941 |
| 2,353,161 | Heigis | July 11, 1944 |
| 2,481,713 | Bertea | Sept. 13, 1949 |
| 2,666,614 | Grove | Jan. 19, 1954 |